United States Patent
Connolly et al.

(10) Patent No.: US 11,834,988 B1
(45) Date of Patent: Dec. 5, 2023

(54) TURBINE ENGINE INERTIAL PARTICLE SEPARATOR WITH PARTICLE REBOUND SUPPRESSION

(71) Applicants: Rolls-Royce North American Technologies Inc., Indianapolis, IN (US); University of Virginia Patent Foundation, Charlottesville, VA (US)

(72) Inventors: Brian J. Connolly, Charlottesville, VA (US); Eric Loth, Charlottesville, VA (US); Crawford F. Smith, III, Indianapolis, IN (US)

(73) Assignees: Rolls-Royce North American Technologies Inc., Indianapolis, IN (US); University of Virginia Patent Foundation, Charlottesville, VA (US)

( * ) Notice: Subject to any disclaimer, the term of this patent is extended or adjusted under 35 U.S.C. 154(b) by 0 days.

(21) Appl. No.: 17/841,281

(22) Filed: Jun. 15, 2022

(51) Int. Cl.
  *F02C 7/052* (2006.01)

(52) U.S. Cl.
  CPC ........ *F02C 7/052* (2013.01); *F05D 2260/607* (2013.01)

(58) Field of Classification Search
  CPC .. F02C 7/05; F02C 7/052; F02C 7/047; F05D 2260/607
  See application file for complete search history.

(56) References Cited

U.S. PATENT DOCUMENTS

| | | | |
|---|---|---|---|
| 3,338,049 A | 8/1967 | Marshall | |
| 3,766,719 A * | 10/1973 | McAnally, III | B01D 45/16 55/306 |
| 4,268,287 A | 5/1981 | Norris | |
| 4,509,962 A | 4/1985 | Breitman et al. | |
| 6,702,873 B2 | 3/2004 | Hartman | |
| 7,678,165 B2 | 3/2010 | Tingle et al. | |
| 7,802,433 B2 | 9/2010 | Higgins | |
| 7,927,408 B2 | 4/2011 | Sheoran et al. | |
| 8,945,254 B2 | 2/2015 | Mayer et al. | |
| 9,206,740 B2 | 12/2015 | Wong et al. | |
| 9,631,554 B2 | 4/2017 | Howe et al. | |
| 9,638,103 B2 | 5/2017 | Howe et al. | |
| 9,709,275 B2 | 7/2017 | De Diego et al. | |
| 10,227,924 B2 | 3/2019 | Snyder et al. | |
| 10,480,413 B2 | 11/2019 | Snyder | |
| 10,724,436 B2 | 7/2020 | Mayer et al. | |

(Continued)

FOREIGN PATENT DOCUMENTS

| CN | 109519282 | 3/2019 |
|---|---|---|
| CN | 110617149 | 12/2019 |

OTHER PUBLICATIONS

Lancaster, J. K., "Abrasive wear of polymers," Wear, vol. 14, Oct. 1969, pp. 223-239.

(Continued)

*Primary Examiner* — Steven M Sutherland
(74) *Attorney, Agent, or Firm* — Barnes & Thornburg LLP

(57) ABSTRACT

An inlet duct for a gas turbine engine includes a particle separator, a scavenge duct, and a layer of material having a low coefficient of restitution. The particle separator including an outer wall spaced, an inner wall, and a splitter located radially between the outer wall and the inner wall. The (Continued)

scavenge duct is coupled with particle separator. The layer of material is located on at least one of the outer wall, the splitter, and the scavenge duct.

16 Claims, 4 Drawing Sheets

(56) References Cited

U.S. PATENT DOCUMENTS

| | | | |
|---|---|---|---|
| 10,738,699 | B2 | 8/2020 | Burnside |
| 10,767,558 | B2 | 9/2020 | Smith, III et al. |
| 10,767,559 | B2 | 9/2020 | Smith, III et al. |
| 10,947,901 | B2 | 3/2021 | Darling et al. |
| 11,008,939 | B2 | 5/2021 | Snyder |
| 11,066,996 | B2 | 7/2021 | Marrano et al. |
| 11,073,083 | B2 | 7/2021 | Snyder et al. |
| 2014/0144123 | A1 | 5/2014 | Judd et al. |
| 2014/0190347 | A1* | 7/2014 | Wong ............... F02C 7/052 95/216 |
| 2016/0177824 | A1 | 6/2016 | Ponton et al. |
| 2016/0265434 | A1 | 9/2016 | Snyder |
| 2022/0056845 | A1 | 2/2022 | Marrano et al. |

OTHER PUBLICATIONS

Israel, R., and Rosner, D. E., "Use of a Generalized Stokes Number to Determine the Aerodynamic Capture Efficiency of Non-Stokesian Particles from a Compressible Gas Flow," Aerosol Science and Technology, vol. 2, Sep. 1982, pp. 45-51.

Connolly, B., Loth, E., Snyder, P. H., and Smith, C. F., "Influence of Scavenge Geometry on Separation Efficiency for an Inertial Particle Separator," American Institute of Aeronautics and Astronautics, 2016.

Connolly, B., Loth, E., and Smith, C. F., "Novel Outer Surface Geometry for an Inertial Particle Separator," American Institute of Aeronautics and Astronautics, 2017.

Aarnes, J. R., Haugen, N. E. L., and Andersson, H. I., "Inertial particle impaction on a cylinder in turbulent cross-flow at modest Reynolds numbers," International Journal of Multiphase Flow, vol. 111, Feb. 2019, pp. 53-61.

* cited by examiner

TURBINE ENGINE INERTIAL PARTICLE SEPARATOR WITH PARTICLE REBOUND SUPPRESSION

FIELD OF THE DISCLOSURE

The present disclosure relates generally to gas turbine engines, and more specifically to air-inlet ducts included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and the resulting fuel-air mixture is ignited. Products of the combustion reaction in the combustor are directed into the turbine where work is extracted to drive the compressor and, sometimes, an output shaft. Left-over products of the combustion reaction are exhausted out of the turbine and may provide thrust in some applications.

Air is drawn into the engine through an air inlet and communicated to the compressor via an air-inlet duct. In some operating conditions, particles such as dust, sand, or liquid water may be entrained in the air and may be drawn into the air inlet and passed through the air-inlet duct to the compressor. Such particles may impact components of the compressor and turbine causing unintended wear. This unintended wear may decrease power output of the engine, shorten the life span of the engine, and lead to increased maintenance costs and increased down time of the engine.

SUMMARY

The present disclosure may comprise one or more of the following features and combinations thereof.

According to an illustrative aspect of the present disclosure, an air-inlet duct for a gas turbine engine includes a particle separator. The particle separator is formed to include an inlet passageway, a compressor passageway, and a scavenge passageway. The inlet passageway receives a stream of air. The compressor passageway and the scavenge passageway both extend downstream from the inlet passageway.

The particle separator receives atmospheric air laden with particles and is configured to direct the particles into the scavenge passageway while allowing the atmospheric air to move into the compressor passageway. This reduces a number of particles that enter the compressor passageway.

The particle separator also includes an outer wall, an inner wall, and a splitter. The outer wall is spaced apart from an engine rotation axis. The inner wall is located radially between the outer wall and the engine rotation axis and defines the inlet passageway between the inner wall and the outer wall. The splitter is located radially between the outer wall and the inner wall, and includes an outer splitter surface and an inner splitter surface. The outer splitter surface cooperates with the outer wall to define the scavenge passageway. The inner splitter surface cooperates with the inner wall to define the compressor passageway.

The air-inlet duct also includes means for reducing the coefficient of restitution on the outer wall of the particle separator to reduce a velocity of the particles colliding with the outer wall. Such means prevents the particles from bouncing off of the outer wall and flowing into the compressor passageway.

In some embodiments, the means for reducing the coefficient of restitution on the outer wall of the particle separator is a fluid injection conduit. The fluid injection conduit opens into the inlet passageway and is arranged to direct a stream of liquid along the outer wall and into the scavenge passageway. The stream of liquid entrains the particles in the liquid that is directed into the scavenge passageway to prevent the particles from entering the compressor passageway.

In some embodiments, the fluid injection conduit is located within the inlet passageway and is coupled with the outer wall. In other embodiments, the fluid injection conduit extends radially inward toward the outer wall and directs the stream of liquid radially inward and axially aft through an opening in the outer wall. In some embodiments, the outer wall defines a plurality of axially extending channels. The axially extending channels provide additional surface area for the liquid to adhere to and to guide the liquid axially aft into the scavenge passageway.

In some embodiments, the outer wall includes an inner surface and a plurality of planar channel walls. The plurality of planar channel walls extend radially inward from the inner surface to define the plurality of axially extending channels. In some embodiments, the outer wall includes a plurality of angled surfaces. The plurality of angled surfaces extend in an alternating radially outward and radially inward pattern to form the plurality of axially extending channels. In some embodiments, at least a portion of an inner surface of the outer wall which is exposed to the inlet passageway is formed from a low coefficient of restitution material that is different than a material of the inner wall.

In some embodiments the means for reducing the coefficient on the outer wall of the particle separator is a layer of material which has a low coefficient of restitution located along the outer wall of the particle separator. In some embodiments, the means for reducing the coefficient of restitution on the outer wall of the particle separator is a plurality of axially extending channels which are defined by the outer wall.

In some embodiments, the scavenge passageway defines a channel cross-sectional area between the outer wall and the outer splitter surface, while the compressor passageway defines a channel cross-sectional area between the inner wall and the inner splitter surface. A sum of the channel cross-sectional area of the scavenge passageway and the channel cross-sectional area of the compressor passageway defines a total channel area. The channel cross-sectional area of the scavenge passageway is a percent of the total channel area equal to about one half of the percent of a mass flow rate of air in the scavenge passageway compared to a total mass flow rate of air in the scavenge passageway and the compressor passageway.

According to another illustrative aspect of the present disclosure, an air inlet duct for a gas turbine engine includes a particle separator and a fluid injection system. The particle separator includes an inner wall, an outer wall, and a splitter. The outer wall is arranged circumferentially around the inner wall relative to an axis. The splitter is located radially between the inner wall and the outer wall. The inner wall and the outer wall define an inlet passageway, the inner wall and the splitter define a compressor passageway, and the outer wall and the splitter define a scavenge passageway. The inlet passageway receives a stream of air laden with particles. The compressor passageway and the scavenge passageway both extend downstream from the inlet passageway.

The fluid injection system is configured to direct a stream of liquid along the outer wall and into the scavenge passageway. The stream of liquid entrains the particles in the liquid to prevent the particles from flowing into the compressor passageway.

In some embodiments, the fluid injection conduit is located in the inlet passageway and coupled with the outer wall. In some embodiments, the fluid injection conduit extends radially inward toward the outer wall and directs the stream of liquid radially inward and axially aft through an opening in the outer wall. In some embodiments, the outer wall defines a plurality of axially extending channels which are configured to provide additional surface area to which the stream of liquid adheres. In some embodiments, a layer of material is located along the outer wall. The layer of material has a coefficient of restitution that is less than a coefficient of restitution of a material of the inner wall.

In some embodiments, the scavenge passageway defines a channel cross-sectional area ($SP_a$) between the outer wall and an outer splitter surface of the splitter, while the compressor passageway defines a channel cross-sectional area ($CP_a$) between the inner wall and an inner splitter surface of the splitter. The inlet passageway defines a minimal channel cross-sectional area ($IP_a$) between the inner wall and the outer wall, while a distance (d) is defined between a location of the minimal channel cross-sectional area of the inlet passageway ($IP_a$) and a tip of the splitter. Accordingly, $(SP_a+(CP_a))/((IP_a) \times (d))$ is equal to or less than 0.5.

According to another illustrative aspect of the present disclosure, a method of reducing particle ingestion in a gas turbine engine includes a step of receiving a flow of atmospheric air laden with particles in an inlet passageway of an air-inlet duct of the gas turbine engine. The method includes a step of directing, with a splitter, a first portion of the flow with the particles into a scavenge passageway of the air-inlet duct defined between the splitter and an outer wall of the air-inlet duct. The method also includes a step of directing, with the splitter, a second portion of the flow without the particles into a compressor passageway of the air-inlet duct defined between the splitter and an inner wall of the air-inlet duct. The method further includes a step of injecting a fluid into the inlet passageway and along the outer wall. The fluid travels along the outer wall and into the scavenge passageway, and the fluid collects the particles that collide with the outer wall and transports the particles into the scavenge passageway.

In some embodiments, the method further includes the step of applying a layer of material to the outer wall. The layer of material has a coefficient of restitution that is less than a coefficient of restitution of the inner wall.

In some embodiments, the scavenge passageway defines a channel cross-sectional area between the outer wall and an outer splitter surface of the splitter, while the compressor passageway defines a channel cross-sectional area between the inner wall and an inner splitter surface of the splitter. A sum of the channel cross-sectional area of the scavenge passageway and the channel cross-sectional area of the compressor passageway defines a total channel area. The channel cross-sectional area of the scavenge passageway is a percent of the total area equal to about one half of the percent of mass flow rate of air in the scavenge passageway compared to total mass flow rate of air in the scavenge passageway and the compressor passageway.

These and other features of the present disclosure will become more apparent from the following description of the illustrative embodiments.

DETAILED DESCRIPTION OF THE DRAWINGS

Figure 1:
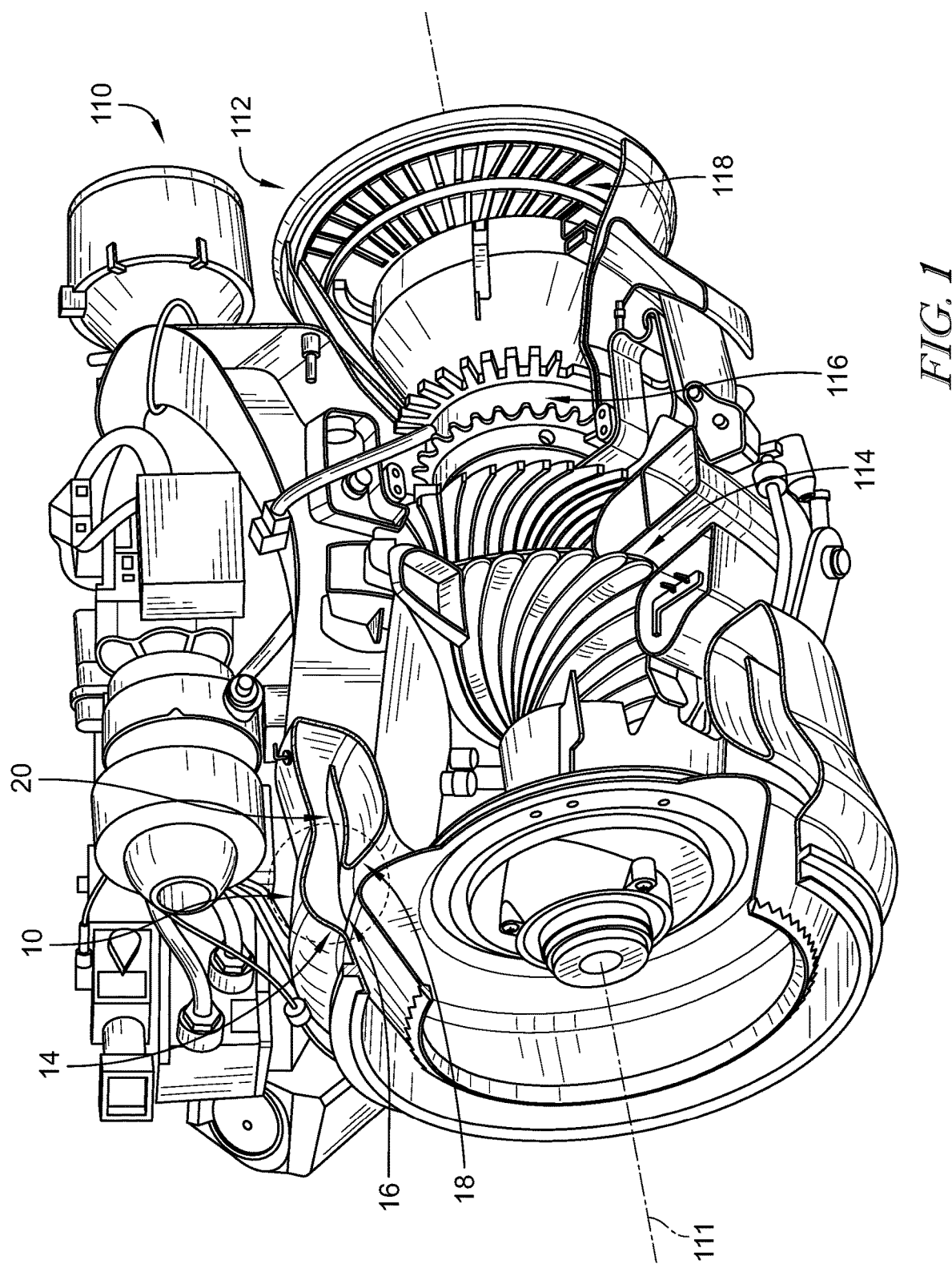
FIG. 1 is a cut-away perspective view of a gas turbine engine showing that the gas turbine engine includes an air-inlet duct adapted to conduct air entering the gas turbine engine into a compressor included in the gas turbine engine.

For the purposes of promoting an understanding of the principles of the disclosure, reference will now be made to a number of illustrative embodiments illustrated in the drawings and specific language will be used to describe the same.

A gas turbine engine 110 in accordance with the present disclosure is shown, for example, in FIG. 1. The gas turbine engine 110 includes an air-inlet duct 10 and an engine core 112. The engine core 112 includes a compressor 114, a combustor 116, and a turbine 118. Air is drawn into the gas turbine engine 110 through the air-inlet duct 10 prior to admission of the air into the compressor 114 as suggested in FIG. 1. In some environments, particles such as dirt, sand, or liquid water may be entrained in the air and carried into the gas turbine engine 110. The air-inlet duct 10 is configured to separate the particles from the air to cause clean air, generally free from large particles, to be delivered to the compressor 114 so that damage to the compressor 114 and the turbine 118 can be reduced.

Figure 2:
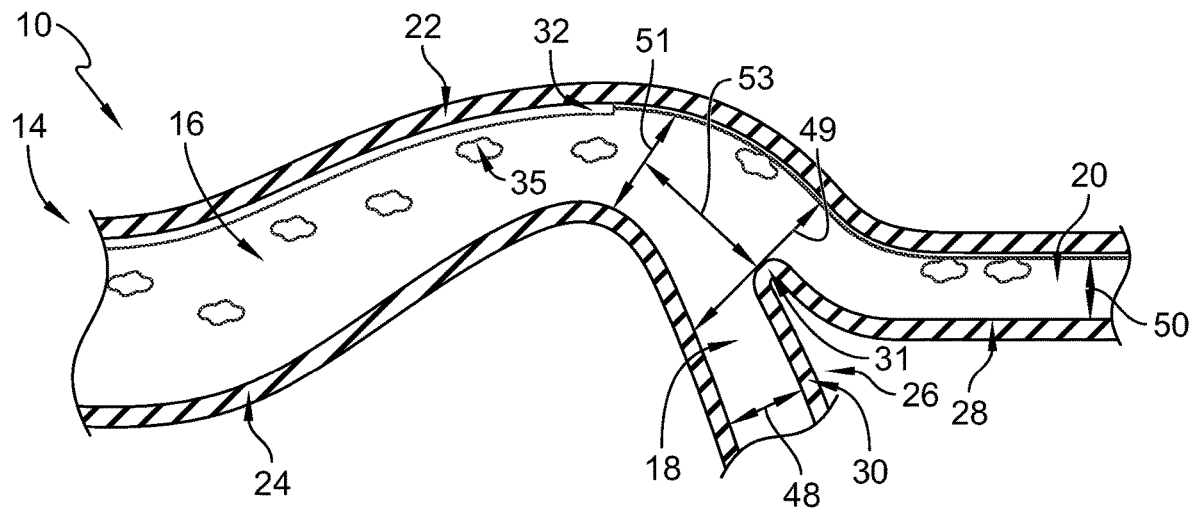
FIG. 2 is an enlarged partial view of the circled region of FIG. 1 showing the air-inlet duct includes a particle separator that includes a fluid injection conduit configured to conduct fluid into an inlet passageway of the particle separator to reduce a coefficient of restitution of an outer wall of the particle separator to capture particles directing them into a scavenge passageway and to prevent particles from bouncing off of the outer wall and into a compressor passageway.

The air-inlet duct 10 illustratively includes a particle separator 14 formed to define an inlet passageway 16, a compressor passageway 18, and a scavenge passageway 20 as shown in FIG. 2. The particle separator 14 is configured to receive atmospheric air laden with particles 35. The inlet passageway 16 is configured to receive atmospheric air. The compressor passageway 18 and the scavenge passageway 20 each extend downstream from the inlet passageway 16. The compressor passageway 18 is fluidly connected to the compressor 114. The particle separator 14 is configured to direct a dirty flow of air and particles 35 into the scavenge passageway 20 while allowing the atmospheric air free of particles 35 to move into the compressor passageway 18.

The particle separator 14 includes an outer wall 22, an inner wall 24, and a splitter 26 as shown in FIG. 2. The outer wall 22 is spaced apart from an engine rotation axis 111. The inner wall 24 is located radially between the outer wall 22 and the engine rotation axis 111 so that the inlet passageway 16 is defined between the inner wall 24 and the outer wall 22. The splitter 26 is located radially between the outer wall 22 and the inner wall 24.

The splitter 26 includes an outer splitter surface 28 and an inner splitter surface 30 as shown in FIG. 2. The outer splitter surface 28 cooperates with the outer wall 22 to define the scavenge passageway 20, while the inner splitter surface 30 cooperates with the inner wall 24 to define the compressor passageway 18.

The particle separator 14 includes means for reducing the coefficient of restitution on the outer wall 22 to reduce the velocity of the particles 35 colliding with the outer wall 22 and prevent the particles 35 from bouncing off of the outer wall 22 and flowing into the compressor passageway 18. As such, the particle separator 14 directs more particles 35 into the scavenge passageway as compared to conventional particle separators.

In the illustrative embodiments of FIGS. 2-6, the means for reducing the coefficient of restitution includes a fluid injection conduit 32. In some embodiments, the means includes a plurality of fluid injection conduits 32 arranged circumferentially about the axis 111. The fluid injection conduit 32 opens into the inlet passageway 16 and is arranged to direct a stream of liquid 34 along the outer wall 22 and into the scavenge passageway 20. The stream of liquid 34 has a lower coefficient of restitution than the material of the outer wall 22 such that any particles 35 that bounce off of the stream of liquid 34 have a reduced velocity as compared to bouncing off of the outer wall 22 directly. The stream of liquid 34 may further entrain the particles 35 in the liquid 34 which is directed into the scavenge passageway 20 to prevent the particles from entering the compressor passageway 18. The stream of liquid 34 may be water, hydraulic fluid, coolant, antifreeze, engine oil, or any other fluid stored on an aircraft which is capable for use in a gas turbine engine 110.

The stream of liquid 34 is non-atomized in the illustrative embodiments. In other words, the stream of liquid 34 is bulk liquid in the illustrative embodiments. The stream of liquid 34 is directed along the outer wall 22 so that the bulk liquid acts as a liquid coat on the outer wall 22 having the lower coefficient of restitution as compared to the material of the outer wall 22.

Figure 3:
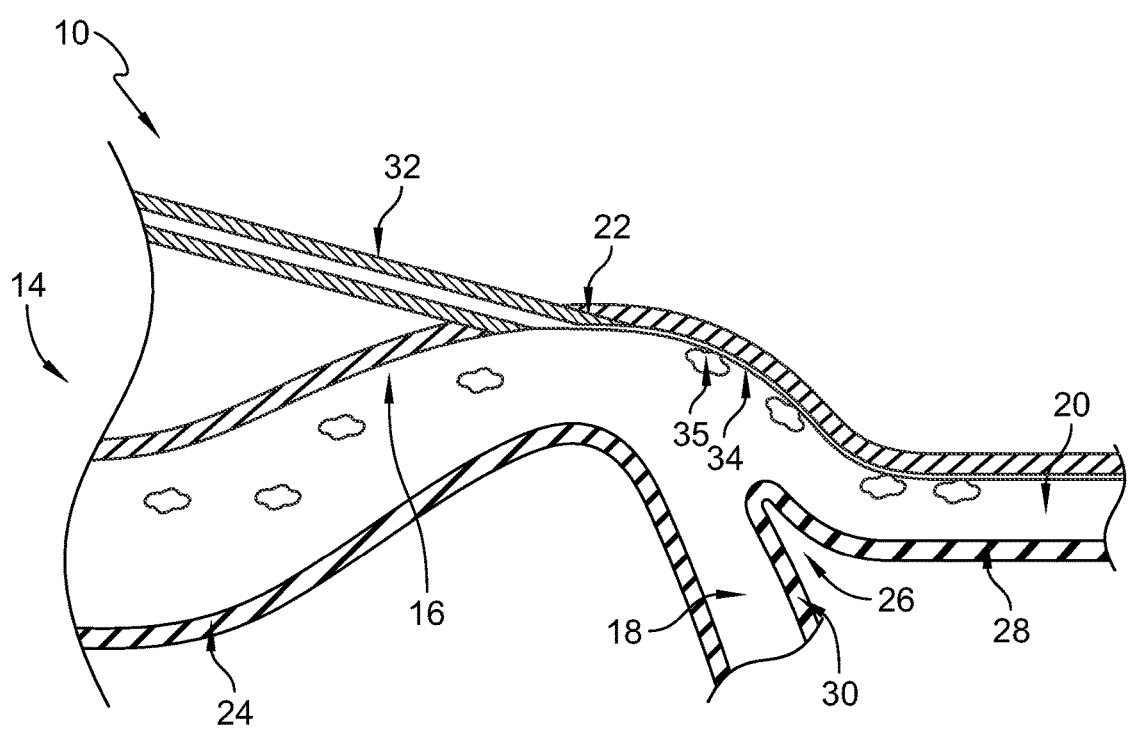
FIG. 3 is a view similar to FIG. 2 showing another embodiment of an air-inlet duct adapted for inclusion in the gas turbine engine of FIG. 1, the particle separator having a fluid injection conduit extending from outside the inlet passageway to within the inlet passageway and configured to conduct fluid into the inlet passageway of the particle separator.

The fluid injection conduit 32 directs the stream of liquid 34 from a fluid source (not shown) in the gas turbine engine 110 as shown in FIGS. 2-3. In one embodiment, as shown in FIG. 2, the fluid injection conduit 32 is located within the inlet passageway 16 and is engaged with and/or coupled with the outer wall 22. In another embodiment, as shown in FIG. 3, the fluid injection conduit 32 is located radially outward of the particle separator 14 and extends radially inward toward the outer wall 22 such that it directs the stream of liquid 34 radially inward and axially aft through an opening 23 in the outer wall 22 and in a direction to cause the stream of liquid to travel along the outer wall 22.

Figure 4:
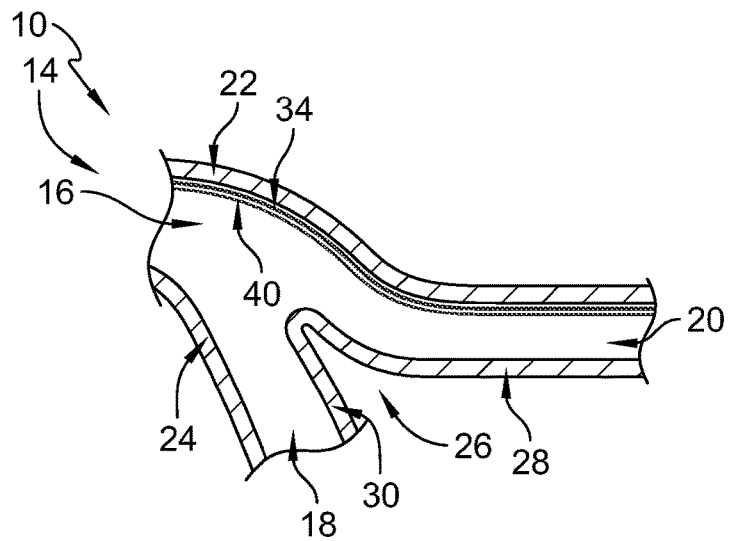
FIG. 4 is an enlarged partial view similar to FIG. 2 showing another embodiment of an air-inlet duct adapted for inclusion in the gas turbine engine of FIG. 1, the outer wall of the particle separator including a plurality of planar channel walls defining a plurality of axially extending channels to guide the fluid along the outer wall and to potentially trap particles between the channels.
Figure 5:
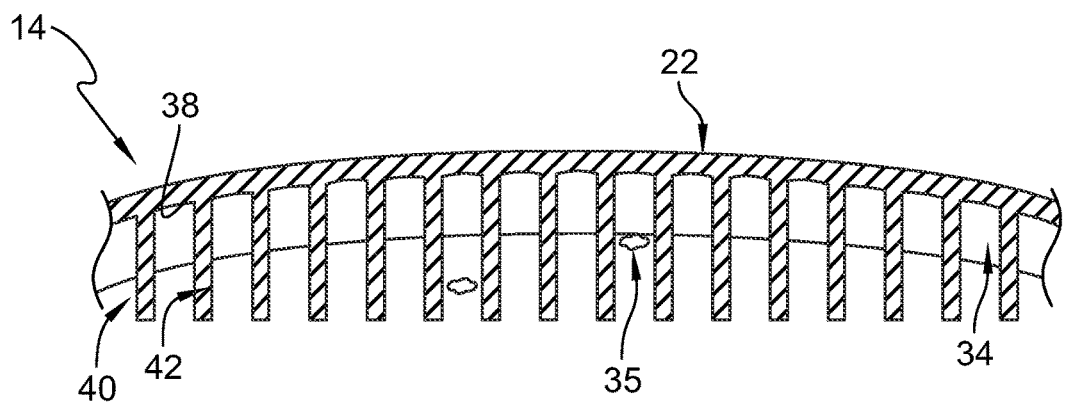
FIG. 5 is an axial view of a cross-section of the air-inlet duct of FIG. 4 showing the planar channel walls extending radially away from an inner surface of the outer wall.
Figure 6:
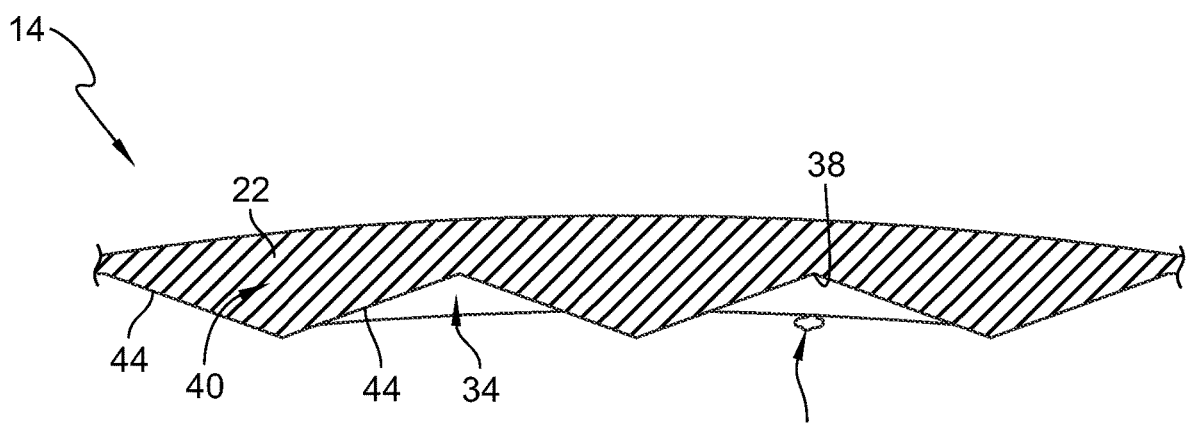
FIG. 6 is an axial view of a cross-section of another embodiment of the air-inlet duct of FIG. 4 showing angled and planar channel walls extending in an alternating radially outward and radially inward pattern.

In some embodiments, the outer wall 22 is continuous circumferentially without protrusions as shown in FIGS. 2 and 3. In other embodiments, the outer wall 22 includes a plurality of axially extending channels 40 that extend radially inward from an inner surface 38, as shown in FIGS. 4-6. The plurality of axially extending channels 40 can be used in combination with any of the means of reducing the coefficient of restitution and/or other features disclosed in the present application.

The plurality of axially extending channels 40 provide additional surface area for the stream of liquid 34 to adhere to when the fluid injection conduit 32 directs the stream of liquid 34 along the outer wall 22. For example, surface tension of the liquid 34 may cause the liquid 34 to flow along and stay attached to the channels 40 and outer wall 22 better than if no channels 40 where provided on the outer wall 22. The plurality of axially extending channels 40 also guide the stream of liquid 34 axially aft from the fluid injection conduit 32 into the scavenge passageway 20. The plurality of axially extending channels 40 may also trap particles 35 therein by causing the particles 35 to bounce circumferentially back and forth between a pair of adjacent channel walls.

In some embodiments, the plurality of axially extending channels 40 are defined by a plurality of planar channel walls 42 that extend radially inward from the inner surface 38, as shown in FIG. 5. In some embodiments, the channel walls 42 have approximately 90 degree edges at their radial inner ends as shown in FIG. 5. In other embodiments, the channel walls 42 have rounded or filleted edges at their radial inner ends. In other embodiments, the plurality of axially extending channels 40 are defined by a plurality of angled surfaces 44 that extend in an alternating radially outward and radially inward pattern relative to the inner surface 38, as shown in FIG. 6. In other embodiments, the particle separator 14 does not include the fluid injection conduit 32, but includes the plurality of axially extending channels 40.

Figure 7:
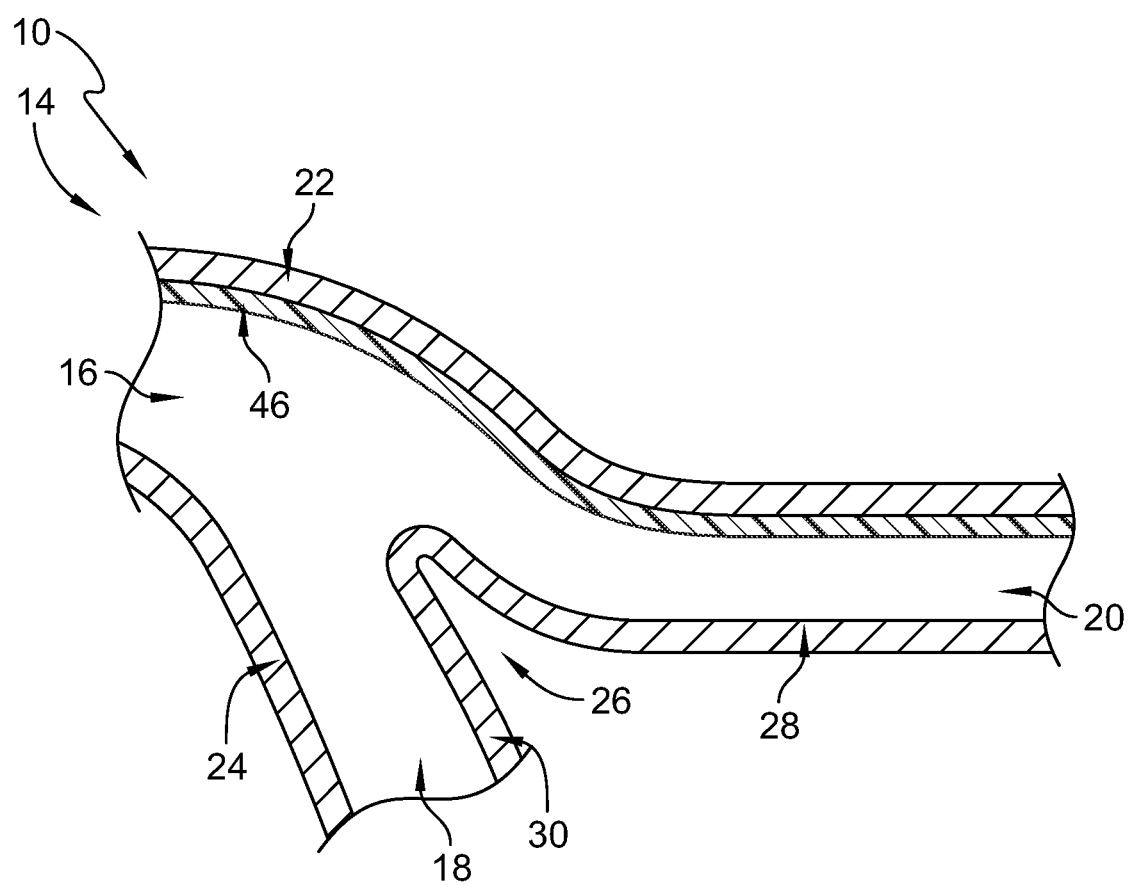
FIG. 7 is an enlarged partial view of another embodiment of an air-inlet duct adapted for inclusion in the gas turbine engine of FIG. 1, the air-inlet duct having a layer of material with a low coefficient of restitution on the outer wall of the particle separator.

In the illustrative embodiment of FIG. 7, the means for reducing the coefficient of restitution includes a layer of material 46 positioned along the outer wall 22. The layer of material 46 is a material having a low coefficient of restitution. The layer of material 46 has a coefficient of restitution that is less than the coefficient of restitution of the outer wall 22.

In some embodiments, the coefficient of restitution of the layer of material 46 is less than about 0.75. In some embodiments, the coefficient of restitution of the layer of material 46 is less than about 0.6. In some embodiments, the coefficient of restitution of the layer of material 46 is less than about 0.5. In some embodiments, the coefficient of restitution of the layer of material 46 is less than about 0.4. In some embodiments, the coefficient of restitution of the layer of material 46 is less than about 0.3. In some embodiments, the coefficient of restitution of the layer of material 46 is less than about 0.25. In some embodiments, the coefficient of restitution of the layer of material 46 is less than about 0.2. In some embodiments, the coefficient of restitution of the layer of material 46 is less than about 0.1.

In the present embodiment, the layer of material 46 is located radially inward of the outer wall 22. In some embodiments, the means for reducing the coefficient of restitution includes the layer of material 46 used with the fluid injection conduit 32 and the stream of liquid 34 from the fluid injection conduit 32 directed over the layer of material 46. The layer of material 46 may also be applied to the plurality of axially extending channels 40 with or without receiving the stream of liquid 34 from the fluid injection conduit 32.

Referring to FIG. 2, the particle separator 14 includes a ratio of a channel cross-sectional area 50 of the scavenge passageway 20 between the outer wall 22 and the outer splitter surface 28 to a channel cross-sectional area 48 of the compressor passageway 18 between the inner wall 24 and the inner splitter surface 30. In some embodiments, this area ratio is less than, equal to or about equal to a ratio of 0.5. In the illustrative embodiment, the channel cross-sectional area 50 is less than the channel cross-sectional area 48 and is also less than that of a typical scavenge passageway.

A flow velocity of air moving through the compressor passageway 18 or the scavenge passageway 20 is a function of density of the air, mass flow rate of the air in the compressor passageway 18 and the scavenge passageway 20, and the channel cross sectional area 48, 50. The flow density is generally the same in both channels 18, 20 in the illustrative embodiment. As such, a ratio of the channel cross-sectional area 50 to the channel cross-sectional area 48 in the illustrative embodiment is half or about half a ratio of the mass flow rate of the air in the scavenge passageway 20 to the mass flow rate of the air in the compressor passageway 18. As a result, the flow velocity of the air moving through the scavenge passageway 20 is double or about double the flow velocity of the air moving through the compressor passageway 18.

In some embodiments, the channel cross-sectional area 50 of the scavenge passageway 20 compared to the channel cross-sectional area 48 of the compressor passageway 18 is equal to or less than 0.5 times the percent mass flow of the scavenge passageway 20 as compared to the mass flow of the compressor passageway 18. For example, a mass flow of 20 percent scavenge passageway 20 and 80 percent compressor passageway 18 would be provided by the channel cross-sectional area 50 of the scavenge passageway 20 being 10 percent of a total area 49 (20 percent×0.5) and the channel cross-sectional area 48 of the compressor passageway 18 being 90 percent of the total area 49 (100 percent− (20 percent×0.5)), wherein the total area 49 is equal to the sum of the compressor passageway 18 channel cross-sectional area 48 and the scavenge passageway 20 channel cross-sectional area 50.

In some embodiments, the total area 49 of the compressor and scavenge passageways 18, 20 divided by the minimal channel cross-sectional area 51 of the inlet passageway 16 times the distance 53 between a tip 31 of the splitter 26 and the location of the minimal channel cross-sectional area 51 is less than 0.5. That is: (channel cross-sectional area 48+channel cross-sectional area 50)=total area 49; (minimal channel cross-sectional area 51×distance 53)=inlet volume; and total area 49/inlet volume 0.5.

The means for reducing the coefficient of restitution and, thus, the corresponding reduction of the velocity of the particles 35 bouncing off of the outer wall 22 and into the compressor passageway 18 may allow for improvement in the collection of particles in the scavenge passageway 20. The means for reducing the coefficient of restitution may allow for or improve the ratio discussed above due to more or a same number of particles 35 entering the scavenge passageway for a relatively smaller area scavenge passageway 20.

The reduced bouncing allows the scavenge passageway 20 cross-sectional area 50 to be smaller, relative to the compressor passageway 18 cross-sectional area 48, than conventional inertial particle separator designs. For conventional particle separators with no coefficient of restitution reduction, large particles may bounce into the compressor flow if a smaller scavenge passageway 20 cross-sectional area 50 is used.

The present disclosure also includes a method for reducing particle 35 ingestion in a gas turbine engine 100. The method may include a step of receiving air laden with particles 35 into the inlet passageway 16. A first portion of the air with the particles 35 is directed with the splitter 26 into the scavenge passageway 20, while a second portion of the air without the particles 35 is directed with the splitter into the compressor passageway 18. The method further comprises a step of injecting the stream of liquid 34 into the inlet passageway 16, along the outer wall 22, and into the scavenge passageway 20. The steam of liquid 34 collects the particles 35 that collide with the outer wall 22 and transports the particles 35 into the scavenge passageway 20. The method may include a step of applying the layer of material 46 to the outer wall 22.

Inertial particle separators 14 may be mounted in-line with gas turbine engines 110 to remove particles 35 from incoming air. Removing particles 35 from incoming air may allow for a cleaner operating environment inside the gas turbine engine 110 and reduces maintenance or damage to the gas turbine engine 110 due to particle 35 ingestion.

The movement of some particles 35 may depend on air drag forces and therefore follow the air flow in the particle separator 14. Meanwhile, the movement of the same or other particles 35 may depend on their own inertial forces and therefore have trajectories based on their inertia and reflections against the outer wall 22, the inner wall 24, the outer splitter surface 28, and the inner splitter surface 30.

To account for this, conventional particle separators 14 may rely on gas flow turning which is aggressive with high centrifugal conditions so that particles 35 may be likely to enter the scavenge passageway 20, but not so aggressive that particles 35 may be driven to the compressor passageway 18. This balancing approach, however, may cause significant sustained and/or transient flow separation just upstream of the scavenge passageway 20. This sustained and/or transient flow separation may create tornadic type vortices which may lead to a significant number of particles 35 flowing into the compressor passageway 18.

This sustained and/or transient flow separation has been identified as a major cause of particle 35 ingestion into the compressor passageway 18 and the rest of the gas turbine engine 110. Additionally, this sustained and/or transient flow separation may increase total pressure losses in the gas turbine engine 110, may create unsteadiness in the air streaming through the gas turbine engine 110, and may require oversizing the scavenge passageway 20 to compensate for this sustained and/or transient flow separation. A particle separator 14 which eliminates transient flow separation while still ensuring high particle 35 removal rates from the air and low weight and power requirements for the scavenge passageway 20 is therefore desired. This is achieved in the present disclosure with reducing the height of the scavenge passageway 20 relative to the height of the compressor passageway 18 so that the ratio of the scavenge passageway 20 height to the compressor passageway 18 height is equal to or about equal to a ratio of a mass flow through the scavenge passageway 20 to a mass flow through the compressor passageway 18.

A particle separator 14 which also includes means for reducing the coefficient of restitution on the outer wall 22 is also desired to reduce the velocity of the particles 35 colliding with the outer wall 22 and prevent the particles 35 from bouncing off of the outer wall 22 and flowing into the compressor passageway 18. The means for reducing the coefficient of restitution may include replacing the outer wall 22 with a material with a low coefficient of restitution or adding a layer of the material 46 with a low coefficient of restitution over the inner surface 38 of the outer wall 22. The material may be any material which has a low coefficient of restitution, such as a polymer. For example, the material should be able to stand up to extensive aerodynamic and thermodynamic stresses and abrasive effects from the particles 35 over a long period of use. The material should also have a low rebound hardness.

The means for reducing the coefficient of restitution may include injecting a stream of liquid 34 along the outer wall 22. The stream of liquid 34 may be used alone or in combination with the layer of material 46. Particles 35 may be entrained by the stream of liquid 34 to transport the particles 35 to the scavenge passageway 20 and away from the compressor passageway 18. The stream of liquid 34 may be water, hydraulic fluid, coolant, antifreeze, or engine oil. The amount of fluid needed to reduce of the coefficient of restitution may be less than the amount of fluid typically ingested by a gas turbine engine 110 during precipitation.

The means for reducing the coefficient of restitution may include a plurality of axially extending channels 40. The plurality of axially extending channels 40 may be used alone or in combination with the layer of material 46 and/or the stream of liquid 34 to reduce the coefficient of restitution. The plurality of axially extending channels 40 may be made of the same material as the rest of the particle separator 14 or the same material as the layer of material 46. The plurality of axially extending channels 40 may be defined by vertical blades 42 or alternating surfaces 44. The plurality of axially extending channels 40 allow for the particles 36 to bounce between the vertical blades 42 or alternating surfaces 44 so that the particles 35 lose energy with each bounce and become trapped within the channel 40 or flow through the channel 40 at a significantly reduced velocity.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An air-inlet duct for a gas turbine engine, the air-inlet duct comprising
    a particle separator formed to include an inlet passageway for receiving a stream of air, a compressor passageway that extends downstream from the inlet passageway, and a scavenge passageway that extends downstream from the inlet passageway, the particle separator configured to receive atmospheric air laden with particles and to direct the particles into the scavenge passageway while allowing the atmospheric air to move into the compressor passageway thereby reducing a number of particles that enter the compressor passageway, the particle separator including:
        an outer wall spaced apart from an engine rotation axis,
        an inner wall located radially between the outer wall and the engine rotation axis to define the inlet passageway between the inner wall and the outer wall, and
        a splitter located radially between the outer wall and the inner wall, the splitter including an outer splitter surface that cooperates with the outer wall to define the scavenge passageway and an inner splitter surface cooperating with the inner wall to define the compressor passageway; and
    means for reducing the coefficient of restitution on the outer wall of the particle separator to reduce a velocity of the particles colliding with the outer wall to prevent the particles from bouncing off of the outer wall and flowing into the compressor passageway,
    wherein the scavenge passageway defines a channel cross-sectional area between the outer wall and the outer splitter surface, the compressor passageway defines a channel cross-sectional area between the inner wall and the inner splitter surface, a sum of the channel cross-sectional area of the scavenge passageway and the channel cross-sectional area of the compressor passageway defines a total channel area, and the channel cross-sectional area of the scavenge passageway is a percent of the total channel area equal to about one half of the percent of a mass flow rate of air in the scavenge passageway compared to a total mass flow rate of air in the scavenge passageway and the compressor passageway.

2. The air-inlet duct of claim 1, wherein the means for reducing the coefficient of restitution on the outer wall of the particle separator includes a fluid injection conduit that opens into the inlet passageway and is arranged to direct a stream of liquid along the outer wall and into the scavenge passageway to entrain the particles in the liquid that is directed into the scavenge passageway to prevent the particles from entering the compressor passageway.

3. The air-inlet duct of claim 2, wherein the fluid injection conduit is located within the inlet passageway and is coupled with the outer wall.

4. The air-inlet duct of claim 2, wherein the fluid injection conduit extends radially inward toward the outer wall and directs the stream of liquid radially inward and axially aft through an opening in the outer wall.

5. The air-inlet duct of claim 2, wherein the outer wall is formed to define a plurality of axially extending channels configured to provide additional surface area for the liquid to adhere to and to guide the liquid axially aft into the scavenge passageway.

6. The air-inlet duct of claim 5, wherein the outer wall includes an inner surface and a plurality of planar channel walls that extend radially inward from the inner surface to define the plurality of axially extending channels.

7. The air-inlet duct of claim 5, wherein the outer wall includes a plurality of angled surfaces that extend in an alternating radially outward and radially inward pattern to form the plurality of axially extending channels.

8. The air-inlet duct of claim 5, wherein at least a portion of an inner surface of the outer wall that is exposed to the inlet passageway is formed from a low coefficient of restitution material that is different than a material of the inner wall.

9. The air-inlet duct of claim 1, wherein the means for reducing the coefficient of restitution on the outer wall of the particle separator includes a layer of material having a low coefficient of restitution located along the outer wall of the particle separator.

10. The air-inlet duct of claim 1, wherein the means for reducing the coefficient of restitution on the outer wall of the particle separator includes a plurality of axially extending channels defined by the outer wall.

11. An air-inlet duct for a gas turbine engine, the air-inlet duct comprising
- a particle separator having an inner wall, an outer wall arranged circumferentially around the inner wall relative to an axis, and a splitter located radially between the inner wall and the outer wall, the inner wall and the outer wall defining an inlet passageway for receiving a stream of air laden with particles, the inner wall and splitter defining a compressor passageway that extends downstream from the inlet passageway, and the outer wall and the splitter defining a scavenge passageway that extends downstream from the inlet passageway, and
- a fluid injection system configured to direct a stream of liquid along the outer wall and into the scavenge passageway to entrain the particles in the liquid to prevent the particles from flowing into the compressor passageway,
- wherein the fluid injection conduit is located in the inlet passageway and coupled with the outer wall.

12. The air-inlet duct of claim 11, wherein the outer wall is formed to define a plurality of axially extending channels configured to provide additional surface area to which the stream of liquid adheres.

13. The air-inlet duct of claim 11, further comprising a layer of material located along the outer wall of the particle separator and wherein the layer of material has a coefficient of restitution that is less than a coefficient of restitution of a material of the inner wall.

14. The air-inlet duct of claim 11, wherein the scavenge passageway defines a channel cross-sectional area (SPa) between the outer wall and an outer splitter surface of the splitter, the compressor passageway defines a channel cross-sectional area (CPa) between the inner wall and an inner splitter surface of the splitter, the inlet passageway defines a minimal channel cross-sectional area (IPa) between the inner wall and the outer wall, a distance (d) is defined between a location of the minimal channel cross-sectional area of the inlet passageway (IPa) and a tip of the splitter, and $(SPa+CPa)/((IPa) \times (d))$ is equal to or less than 0.5.

15. A method of reducing particle ingestion in a gas turbine engine, the method comprising
- receiving a flow of atmospheric air laden with particles in an inlet passageway of an air-inlet duct of the gas turbine engine,
- directing, with a splitter, a first portion of the flow with the particles into a scavenge passageway of the air-inlet duct defined between the splitter and an outer wall of the air-inlet duct,
- directing, with the splitter, a second portion of the flow without the particles into a compressor passageway of the air-inlet duct defined between the splitter and an inner wall of the air-inlet duct, and
- injecting a fluid into the inlet passageway and along the outer wall so that the fluid travels along the outer wall and into the scavenge passageway such that the fluid collects the particles that collide with the outer wall and transports the particles into the scavenge passageway,
- wherein the scavenge passageway defines a channel cross-sectional area between the outer wall and an outer splitter surface of the splitter, the compressor passageway defines a channel cross-sectional area between the inner wall and an inner splitter surface of the splitter, a sum of the channel cross-sectional area of the scavenge passageway and the channel cross-sectional area of the compressor passageway defines a total channel area, and the channel cross-sectional area of the scavenge passageway is a percent of the total channel area equal to about one half of the percent of a mass flow rate of air in the scavenge passageway compared to a total mass flow rate of air in the scavenge passageway and the compressor passageway.

16. The method of claim 15, further comprising applying a layer of material to the outer wall, the layer of material having a coefficient of restitution that is less than a coefficient of restitution of the inner wall.

* * * * *